3,385,763
MALTING PROCESS DESIGNED TO INHIBIT SPROUTING
Felix Bloch, Oakland, Calif., assignor to the United States of America as represented by the Secretary of Agriculture
No Drawing. Filed June 11, 1965, Ser. No. 463,405
6 Claims. (Cl. 195—70)

ABSTRACT OF THE DISCLOSURE

A process of maling grain by subjecting unsteeped cereal grain or cereal grain steeped up to four hours to repeated impact in the presence of an excess of water to inhibit sprouting, thereafter holding the grain under conditions normally conducive to germination, and finally drying the grain. Repeated impact being caused by agitating a body of water against the grain by a power driven propeller.

---

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel processes for malting grains. Further objects of the invention will be evident from the following description wherein parts and percentages are by weight unless otherwise specified. The abbreviation "p.p.m." used herein signifies parts per million.

In conventional malting, the following procedure is employed:

*Steeping.*—The grain (usually barley) is moistened to about 45% $H_2O$. This is commonly accomplished by steeping the grain in an excess of water for a period sufficient to properly moisten the kernels. Often, the steeping is continued until the grains are chitting; that is, until the tips of the rootlets are breaking through the surface of the kernels. Depending on the raw material, the temperature of water, etc., the steeping period may be anywhere from about 20 to 60 hours. It is common to aerate the mixture of water and grain in the steep tank by bubbling air into the mixture through spargers located near the bottom of the tank. The aeration is provided to prevent anaerobic respiration which would lead to reduction in the ability of the grain to germinate. (In conventional malting, it is highly desirable to maintain the germination ability of the grain.)

*Germinations.*—The moistened grain is held under humid and aerated conditions to permit the grains to germinate and to enable development of enzymes. In the older practice the germination was accomplished by spreading the steeped grain on the floor and turning it over at intervals to equalize conditions of temperature and moisture content. In modern plants, germination is carried out in slowly rotating drums or in stationary vessels equipped with devices to mix and turn the mass of grain at intervals. During the process, air is supplied and the mass kept moist by humidifying the air supply and applying extra water by sprays, or the like, as required. In typical operations, the germination is conducted at temperatures of about 55–65° F. for a period of about 5–10 days.

*Drying.*—After the grain has germinated it is dried (or kilned, as the process is often termed) so that it can be stored without spoiling and to develop special flavors as may be required for production of beer, ale, or other fermented beverages. During, or after drying, screening is applied to separate the rootlets, chaff, and other undesired matter from the malted grain.

Certain losses invariably occur in the malting process. For example, in the steeping process there is a loss, generally about 0.5 to 1.5%, by leaching of soluble substances from the grains. During germination, the grains respire, whereby there occurs a loss (by oxidation of sugars to $CO_2$) of about 5–6%. Another item is that during germination the grains put out rootlets in the form of hair-like filaments. In the subsequent drying and cleaning steps, these rootlets are disengaged from the grains and removed from the final product. The loss of substance in this way generally ranges from 3 to 5%.

It is a primary object of the invention to provide malting procedures wherein the losses are reduced, or, expressed in other words, wherein the yield of malted grain is increased. Other objects of the invention are to provide malting processes wherein the time of treatment is decreased and the capacity of the treatment apparatus increased.

Basically, the objects of the invention are attained by stunning the embryos so that sprouting (during the subsequent germination step) is inhibited. This permits one to attain proper enzyme production with minimum sprout development whereby the yield of product is higher, i.e., less material is lost as sprouts. Also, since sprouting is inhibited, there is less loss by respiration in operating in accordance with the invention. Another advantage of the process of the invention is that it affords an increase in germination plant capacity. The basis for this advantage is explained as follows: In conventional malting, 1 cu. ft. of steeped grain increases in volume to about 1.65 cu. ft. after growth of rootlets. In the process of the invention since there is no sprouting, there is no increase in volume when the moistened grain is subjected to germinating conditions.

The stunning, in accordance with the invention, is accomplished by subjecting the grain to repeated impact by water, the force of the impacts and the duration of application thereof being sufficient to cause a substantial reduction of the germinating energy of the grains. It is, of course, obvious that the impacts applied should not be so forceful as to rupture the grains. In a typical embodiment of the invention, a body of water and grain is subjected to agitation with a power-driven propeller which causes violent impact of the water against the grain. This treatment is continued for a period long enough for the germinating energy to be substantially reduced, i.e., so that the growth of rootlets is inhibited for a period of 3 to 6 days, when the treated grain is exposed to conditions conducive to germination. In any particular case, the time during which the violent agitation is applied will vary depending on such factors as the properties of the grain under treatment, the speed and configuration of the propeller, etc. The conditions of the tratment which provides a desired stunning effect can be ascertained by applying treatments under varying conditions to pilot samples of the grain to be treated and conducting germination tests on the treated products. These tests will then indicate the conditions required for treating the main batch of grain.

A typical plan for producing malted grains, utilizing the teaching of the present invention, is outlined below:

The starting material (for example, barley, wheat, rice, oats, or other cereal grain) is moistened so that the grain contains about 40–50% $H_2O$. This may be accomplished in known manner, as by steeping.

The stunning step is applied during the course of the steeping, or, instead of conventional steeping. It is accomplished by applying violent agitation to a body of the grain and water as above described. In addition to the stunning effect, this has the added advantage of increasing the rate at which moisture is taken up by the grain. Thus, by this agitation treatment the total time for moistening may be cut down to as little as one-tenth of the time usually required for moistening grain by conventional steeping methods. In the agitation treatment, the water may be ordinary cold water at about 50–70° F. or it may be warmed, for example, up to 130° F. to attain a faster rate of penetration of water into the kernels. In a preferred embodiment of the invention, the agitation is carried out at a temperature of about 100–120° F. to achieve a rapid rate of penetration of moisture into the grains yet without damage to the enzyme systems therein.

After the grain has been moistened and subjected to the stunning operation, it is then exposed to conditions of germination. It will be noted that because of the stunning effect, actual sprouting will not occur, or be minimal during this treatment so that the usual term "germination" is a misnomer in this case and to provide a desired differentiation of terminology, the treatment will be hereinafter referred to as holding the grain "under conditions normally conducive to germination." The conditions used for the treatment parallel those well known in industry and require no elucidation here, except for the following: One item is that shorter times than with conventional germination provide effective results. This has the benefits of saving in time plus increased yield since there is less opportunity of material losses by respiration. Another item is that since the embryos have been stunned, application of the conditions normally conducive to germination will produce minimal actual germination. Accordingly, it is necessary to provide a replacement for the normal action of the germination process which leads to enzyme development. This replacement is readily accomplished by applying gibberellic acid to the grains. For example, the gibberellic acid may be sprayed onto the grains before they are exposed to the conditions normally conducive to germination. In the alternative, the gibberellic acid may be added to the system of grain and water when the stunning treatment is applied. In any event, only a very small proportion of gibberellic acid is required—i.e., about 0.1 to 10 p.p.m., based on the weight of grain. Usually it is preferred to use about 1 to 2 p.p.m.

After the grain has been held under conditions normally conducive to germination, it is subjected to the usual drying (kilning) and cleaning steps and is then ready for sale or use.

The process of the invention is useful in preparing malted products from grains of all kinds, for example, wheat, barley, oats, rice, rye, corn, etc.

The agitation treatment (applied to stun the embryos) can be carried out in various ways. For example, it may be carried out with or without concommitant aeration. It may be applied after the grain has been steeped by conventional techniques. It may be applied until the grain reaches the desired moisture level, or, the grain may be only partly moistened in the agitation treatment and the moisture level of the grain further increased by additional steeping or by adding water during the stage in which the grain in exposed to conditions normally conducive to germination. It has been observed that stunning is more effective and accomplished with less mechanical damage to the grain when the agitation treatment is applied to grain which has already been moistened. Thus, a preferred procedure involves first moistening the grain by soaking it in water and then applying the agitation step. The soaking is preferably done in warm (about 100–120° F.) water to hasten penetration of moisture into the kernels.

In the steps of steeping and agitation treatment, the grain may be treated with conventional disinfectants such as a hypochlorite. The water may be changed at intervals, or, only during the initial application of water to clean the grain, or, it can be continually changed during the entire steeping and agitation steps.

The invention is further demonstrated by the following illustrative examples. In some of the examples, runs not representative of the procedure of the invention were included for purpose of comparison.

The various procedures referred to in the specific examples were effected as follows:

*Steeping.*—This step was carried out in conventional manner by holding the grain in a tank with water and applying air through a sparger to aerate the mixture of grain and water.

*Agitation treatment.*—The grain and water contained in a tank (18" diameter, 14.5" high) was exposed to the action of a screened 7" propeller driven at 350 r.p.m. In the various runs the water was at different temperatures as noted below in the specific examples.

*Germination.*—After moistening, with or without application of the agitation treatment, the grain was held in a germination drum (12" diameter, 24" long) rotated at 1 rev. per hr. The drum was aerated by a flow of chilled humidified air at controlled temperature.

*Specific runs.*—The type of grain, treatment conditions, and results are given below:

EXAMPLE I.—HARD, RED SPRING WHEAT

| Run | Steeping | | Agitation treatment | | Germination | | Yield of malt, percent (dry basis) | Sprouts, percent (dry basis) | α-Amylase in green malt SKB units (dry basis) |
|---|---|---|---|---|---|---|---|---|---|
| | Time, hrs. | Temp., ° F. | Time, hrs. | Temp., ° F. | Time, days | Temp., ° F. | | | |
| 1 | 24 | 58–62 | (¹) | (¹) | 5 | 56–58 | 90 | 4 | 50 |
| 2 | (¹) | (¹) | 1.5 | ²108 | 4 | 57–58 | 96 | 0 | 200 |
| 3 | (¹) | (¹) | 1.5 | ³105 | 4 | 56–57 | 96 | 0 | 158 |

¹ Not used.
² After agitation, the grain was tumbled for about 50 minutes at room temperature with a dilute solution of gibberellic acid, in amount to furnish 2 p.p.m. thereof.
³ After agitation, the grain was sprayed with gibberellic acid (2 p.p.m.).

EXAMPLE II.—HARD, RED WINTER WHEAT

| Run | Steeping | | Agitation treatment | | Germination | | Yield of malt, percent (dry basis) | Sprouts, percent (dry basis) | α-Amylase in green malt SKB units (dry basis) |
|---|---|---|---|---|---|---|---|---|---|
| | Time, hrs. | Temp., ° F. | Time, hrs. | Temp., ° F. | Time, days | Temp., ° F. | | | |
| 1 | 24 | 61–62 | (¹) | (¹) | 6 | 56 | 90.5 | 4.5 | 61 |
| 2 | 3 | 62 | 4 | ²55–63 | 4 | 56 | 95.8 | 0 | 101 |
| 3 | 1 / 3 | ³56 / 105 | 1 | ²105 | 4 | 57 | 95.8 | 0 | 131 |

¹ Not used.
² In runs 2 and 3, about 2 p.p.m. of gibberellic acid was applied to the grain (by spraying) after the agitation treatment.
³ Steeping was for 1 hour at 56° F., followed by 3 hrs. at 105° F.

EXAMPLE III.—WHITE CLUB WHEAT

| Run | Steeping Time, hrs. | Steeping Temp., °F. | Agitation treatment Time, hrs. | Agitation treatment Temp., °F. | Germination Time, days | Germination Temp., °F. | Yield of malt, percent (dry basis) | Sprouts, percent (dry basis) | α-Amylase in green malt SKB units (dry basis) |
|---|---|---|---|---|---|---|---|---|---|
| 1 | 20 | 58 | (¹) | (¹) | 6 | 56 | 90 | 4 | 43 |
| 2 | 20 | 58 | (¹) | (¹) | 7 | 56 | 89 | 5 | 50 |
| 3 | 20 | 58 | (¹) | (¹) | 8 | 56 | 88 | 6 | 63 |
| 4 | (¹) | (¹) | ½ / 1 | ²55 / 108 | 4 | 56 | 95.1 | 0 | 131 |

¹ Not used.
² The agitation was for ½ hour at 55° F., followed by 1 hour at 100° F. Then, 2 p.p.m. of gibberellic acid was applied to the grain by spraying.

TABLE IV

Hannchen barley was steeped in water at 110–118° F. for 4 hours, then agitated in water, as above described, for 4 hours at 110–114° F. The treated barley was sprayed with 2 p.p.m. of gibberellic acid, then held under germination conditions—4½ days at 57° F.

The results are tabulated below:

Yield of malt, percent (dry basis) _____ 96.4
Sprouts, percent (dry basis) _____ 0
α-Amylase in green malt SKB units (dry basis) ____ 99

Having thus described the invention, what is claimed is:

1. A process for preparing malted grain which comprises subjecting unsteeped cereal grains or cereal grains steeped up to 4 hours to repeated impact forces in the presence of an excess of water, said forces being of sufficient intensity to cause a substantial reduction in the germinating energy of the grains but insufficient to cause rupture of individual grains, thereafter holding the grain under conditions normally conducive to germination, and finally drying the product.

2. A process for preparing malted grain which comprises subjecting unsteeped cereal grains or cereal grains steeped up to 4 hours to repeated impact forces in the presence of an excess of water, said forces being of sufficient intensity to cause a substantial reduction in the germinating energy of the grains but insufficient to cause rupture of individual grains, continuing the application of said impact forces until the germinating energy of the grain is reduced to such a level that the grain will not sprout in 3 to 6 days when exposed to germination conditions, thereafter holding the so-treated grain under conditions normally conducive to germination, and finally drying the product.

3. The process of claim 2 wherein the grain is wheat.

4. The process of claim 2 wherein the grain is barley.

5. The process of claim 2 wherein the subjection of the cereal grain to impact forces is carried out at a temperature about from 100 to 120° F.

6. A process for preparing malted grain which comprises subjecting unsteeped cereal grain or cereal grain steeped up to four hours and excess of water to agitation to cause violent impact of the water against the grains, the agitation being at an intensity sufficient to cause a substantial reduction in the germinating energy of the grains but insufficient to cause rupture of individual grains, continuing the application of said agitation until the moisture content of the grain is about 40 to 50% and until the germinating energy of the grain is reduced to such a level that the grain will not sprout in 3 to 6 days when exposed to germination conditions, thereafter holding the so-treated grain under conditions normally conducive to germination, and finally drying the product.

References Cited

UNITED STATES PATENTS

| | | | |
|---|---|---|---|
| 3,085,945 | 4/1963 | Luchsinger et al. | 195—70 |
| 3,158,551 | 11/1964 | Macey et al. | 195—70 |
| 3,174,909 | 3/1965 | Beckord et al. | 195—70 |

ALVIN E. TANENHOLTZ, *Primary Examiner.*

N. ROSKIN, *Assistant Examiner.*